US 12,279,997 B2

United States Patent
Nishikawa et al.

(10) Patent No.: US 12,279,997 B2
(45) Date of Patent: Apr. 22, 2025

(54) WHEELCHAIR RESTRAINT MECHANISM

(71) Applicant: TOYOTA BOSHOKU KABUSHIKI KAISHA, Aichi (JP)

(72) Inventors: Tokuyuki Nishikawa, Aichi (JP); Keisuke Toda, Aichi (JP); Katsuhito Yamauchi, Aichi (JP); Jacob Richter, Livonia, MI (US); Chandra Jinka, South Lyon, MI (US); Doug Krueger, Macomb Township, MI (US); Tracy Joseph, Clinton Township, MI (US); Enoch Morishima, Sunnyvale, CA (US)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 766 days.

(21) Appl. No.: 17/545,714

(22) Filed: Dec. 8, 2021

(65) Prior Publication Data
US 2023/0172775 A1 Jun. 8, 2023

(51) Int. Cl.
*A61G 3/00* (2006.01)
*A61G 3/08* (2006.01)

(52) U.S. Cl.
CPC .................. *A61G 3/0808* (2013.01)

(58) Field of Classification Search
CPC .................. A61G 3/0808; A61G 3/08
See application file for complete search history.

(56) References Cited

U.S. PATENT DOCUMENTS 5,344,265 A * 9/1994 Ullman ................ A61G 3/0808
410/3
5,489,170 A * 2/1996 Inoue .................. A61G 3/0808
296/63
(Continued)

FOREIGN PATENT DOCUMENTS

CN 102038585 5/2011
CN 204766213 11/2015
(Continued)

OTHER PUBLICATIONS

China Office Action received in CN Application No. 202211554666. 2, dated Jan. 9, 2025, and English language translation thereof.
(Continued)

*Primary Examiner* — Steven O Douglas
(74) *Attorney, Agent, or Firm* — GREENBLUM & BERNSTEIN, P.L.C.

(57) ABSTRACT

The present disclosure provides a wheelchair restraint mechanism that renders easy alignment between a striker and a latch. One mode of the present disclosure is a wheelchair restraint mechanism for restraining a wheelchair to a restraining member installed on a vehicle. The wheelchair restraint mechanism includes an engagement target portion and an engagement portion. The engagement target portion includes a striker having a rod shape extending in up-down directions. The engagement portion includes: a housing member to house the striker; a latch to limit separation of the striker from the housing member; and a guide member to guide the striker towards the housing (Continued)

member. The guide member includes a first guide surface and a second guide surface, which face each other in width directions of the wheelchair and have a distance therebetween decreasing towards the housing member.

5 Claims, 7 Drawing Sheets

(56) References Cited

U.S. PATENT DOCUMENTS

| | | | | |
|---|---|---|---|---|
| 5,628,595 | A * | 5/1997 | Harris | A61G 3/0808 |
| | | | | 410/7 |
| 6,352,396 | B1 * | 3/2002 | Budd | A61G 3/0808 |
| | | | | 410/80 |
| 7,100,718 | B2 * | 9/2006 | Bancroft | A61G 5/1075 |
| | | | | 180/908 |
| 2001/0055520 | A1 | 12/2001 | Budd et al. | |
| 2019/0071181 | A1 | 3/2019 | Demary et al. | |

FOREIGN PATENT DOCUMENTS

| | | |
|---|---|---|
| CN | 109421934 | 3/2019 |
| JP | 8-150176 | 6/1996 |
| JP | 2002-58706 | 2/2002 |

OTHER PUBLICATIONS

Extended European Search Report issued in Application No. 22206325.7, dated May 3, 2023.

* cited by examiner

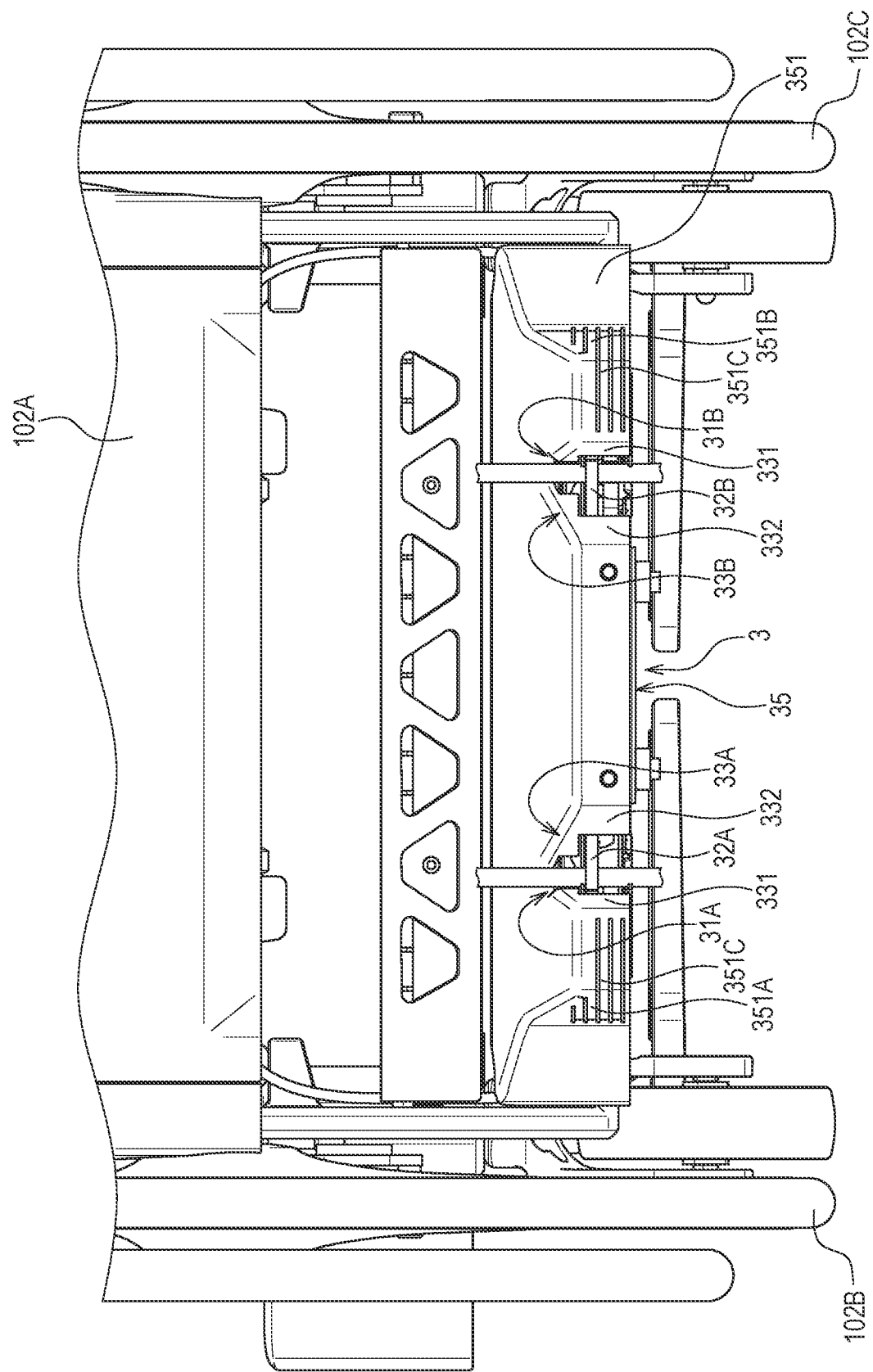

WHEELCHAIR RESTRAINT MECHANISM

BACKGROUND

The present disclosure relates to a wheelchair restraint mechanism.

There has been known a mechanism for restraining a wheelchair onto a floor, or the like, in a vehicle such as an automobile, in which a striker and a latch are used (see, Japanese Unexamined Patent Application Publication No. H8-150176).

SUMMARY

In a conventional restraint mechanism in which a striker and a latch are used, it is necessary to precisely align the striker and the latch because a misalignment between these parts results in failure in restraining the wheelchair. There will be a problem with aligning the striker and the latch where either one of them is not visible.

In one aspect of the present disclosure, it is preferable to provide a wheelchair restraint mechanism that renders easy alignment between the striker and the latch.

One aspect of the present disclosure is a wheelchair restraint mechanism configured to restrain a wheelchair to a restraining member installed on a vehicle. The wheelchair restraint mechanism includes an engagement target portion provided in a first member, which is either one of the wheelchair and the restraining member, and an engagement portion provided in a second member, which is the other one of the wheelchair and the restraining member. The engagement target portion includes at least one striker having a rod shape extending in up-down directions.

The engagement portion includes: at least one housing member configured to house the at least one striker; at least one latch configured to limit separation of the at least one striker from the at least one housing member; and at least one guide member configured to guide the striker towards the at least one housing member.

The at least one guide member includes a first guide surface and a second guide surface, which face each other in width directions of the wheelchair restrained to the restraining member and have a distance therebetween decreasing towards the at least one housing member.

With such configuration, the striker is guided towards the housing member, which is positioned in a fixed manner, by the first guide surface and the second guide surface of the guide member when the engagement target portion and the engagement portion engage with each other. Owing to this, the alignment between the striker and the latch can be easily made.

In one mode of the present disclosure, the engagement target portion may include a plurality of strikers arranged apart from one another in the width directions as the at least one striker. The engagement portion may include: a plurality of housing members; a plurality of latches; and a plurality of guide members, as the at least one housing member, the at least one latch, and the at least one guide member, respectively. Such configuration enables enhancement of a stable restraint of the wheelchair.

In one mode of the present disclosure, the engagement portion may include a base provided with the at least one housing member and the at least one guide member, and a position adjustment mechanism configured to bias the base towards a center in the width directions and to hold the base movably in the width directions. With such configuration, a misalignment between the striker and the latch in the width directions of the wheelchair can be absorbed by a movement of the base in the width directions. This facilitates easy alignment between the striker and the latch.

In one mode of the present disclosure, the engagement target portion may include a bumper disposed on an outer side of the at least one striker in the width directions. A length of the base in the width directions may become greater along an insertion direction of the at least one striker in the at least one housing member. With such configuration, when the engagement target portion and the engagement portion engage with each other, an end of the base in the width directions of the wheelchair comes into contact with the bumper, whereby a position of the base is adjusted. This consequently facilitates easy alignment between the striker and the latch.

In one mode of the present disclosure, the engagement target portion may be provided in the restraining member. The engagement portion may be provided in the wheelchair. Such configuration enables a manipulating part for unlocking the latch to be provided in the wheelchair. It consequently allows the occupant of the wheelchair to release the latch.

In one mode of the present disclosure, the restraining member may be a vehicle seat. Such configuration enables integration of the wheelchair and the vehicle seat. It consequently allows the occupant of the wheelchair to use the seat belt of the vehicle seat.

BRIEF DESCRIPTION OF THE DRAWINGS

An example embodiment of the present disclosure will be described hereinafter by way of example with reference to the accompanying drawings, in which:

FIG. 7 is a schematic rear view of the engagement portion in FIG. 5.

DETAILED DESCRIPTION OF EXEMPLARY EMBODIMENTS

1. First Embodiment

[1-1. Configuration]

Figure 1:
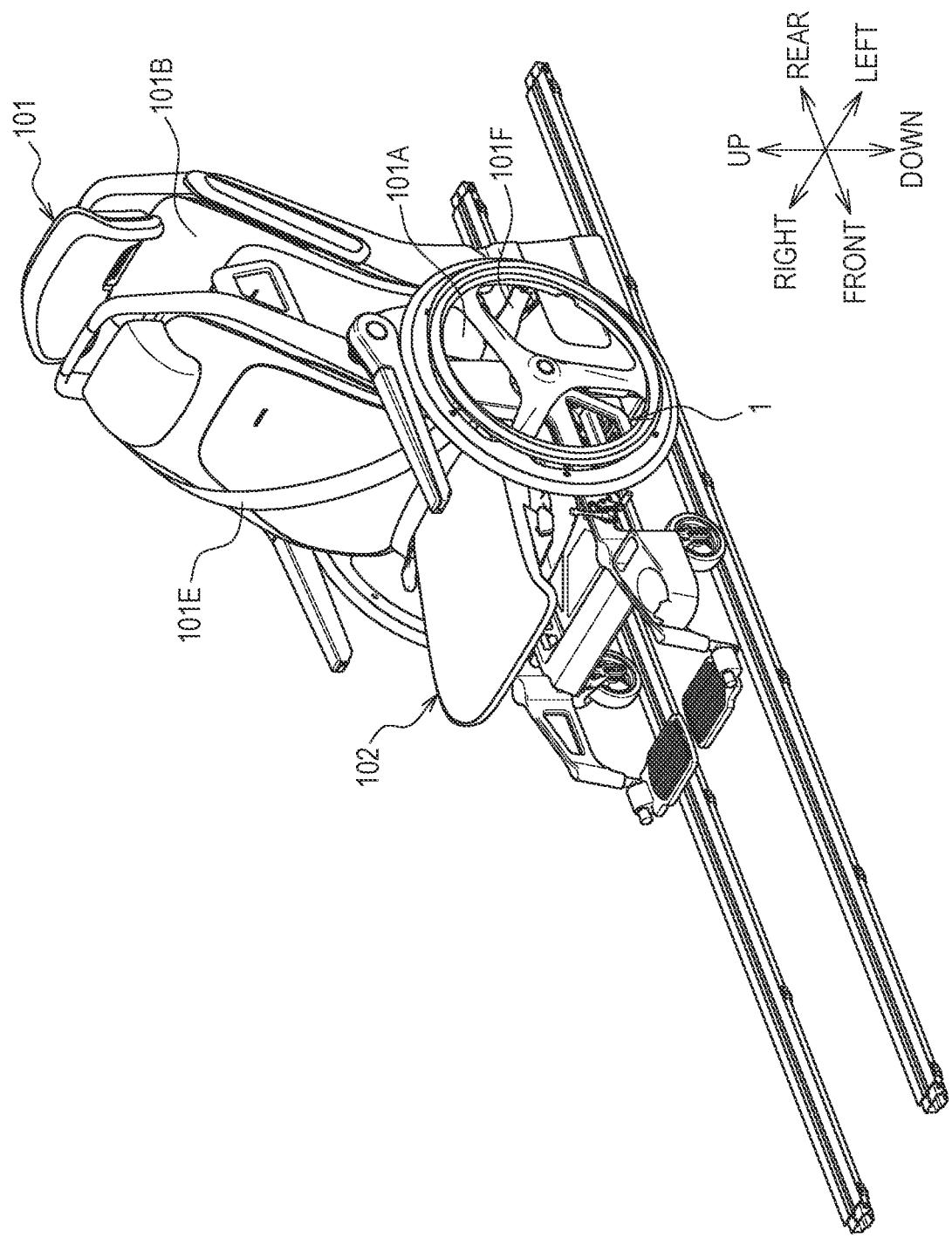
FIG. 1 is a schematic perspective view of a wheelchair restraint mechanism of an embodiment.

A wheelchair restraint mechanism 1 shown in FIG. 1 is a mechanism for restraining a wheelchair 102 to a vehicle seat 101 that is installed on a vehicle. The wheelchair restraint mechanism 1 includes an engagement target portion 2 and an engagement portion 3.

Examples of the vehicle on which the vehicle seat 101 is installed may include automobiles, railroad vehicles, ships, boats, and aircrafts. Directions defined in the description hereafter and in the accompanying drawings correspond to directions from the vehicle seat 101. Front-rear directions, width directions, and up-down directions from the wheelchair 102 restrained to the vehicle seat 101 respectively correspond to front-rear directions, width directions, and up-down directions from the vehicle seat 101.

<Vehicle Seat>

The vehicle seat 101 is used as a seating in the vehicle and also serves as a restraining member for restraining the wheelchair 102.

Figure 2:
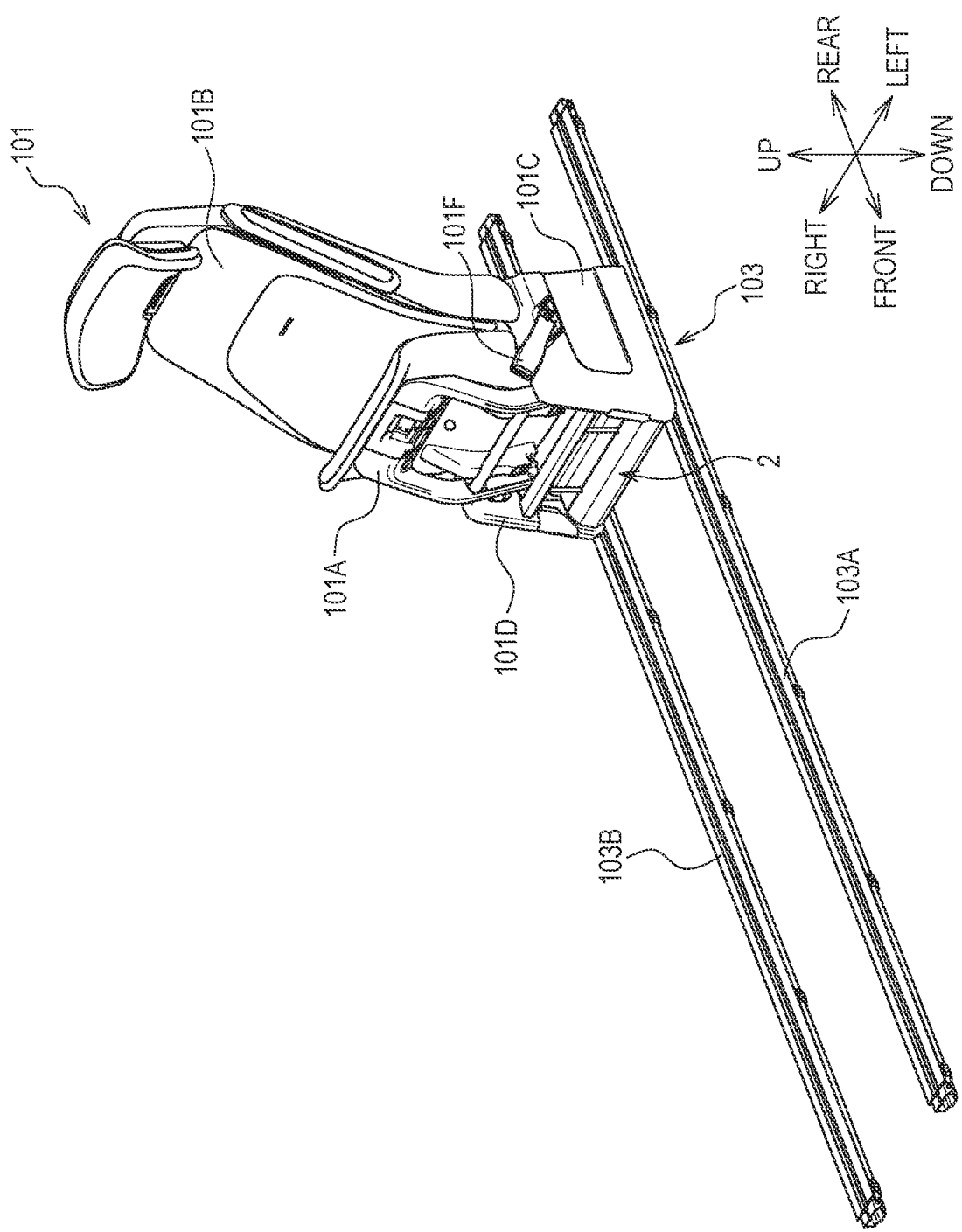
FIG. 2 is a schematic perspective view of a vehicle seat with the wheelchair restraint mechanism in FIG. 1.

As shown in FIG. 2, the vehicle seat 101 includes: a seat cushion 101A; a seatback 101B; a first leg 101C; a second leg 101D; a seat belt 101E (see, FIG. 1); a belt buckle 101F; and the engagement target portion 2.

The seat cushion 101A is a part that supports the buttocks of an occupant of the vehicle seat 101. The seatback 101B is a part that supports the back of the occupant of the vehicle seat 101. As shown in FIG. 2, the seat cushion 101A is flipped up when the wheelchair 102 is restrained. In other words, the seat cushion 101A is configured to pivotally move between its seating position and flipped position.

The first leg 101C and the second leg 101D support the seat cushion 101A and the seatback 101B. The first leg 101C and the second leg 101D are arranged apart from each other in the width directions.

The first leg 101C is disposed on a left side of the second leg 101D. The first leg 101C and the second leg 101D are attached to a sliding mechanism 103 that is installed onto a floor of the vehicle.

The sliding mechanism 103 is configured to cause the vehicle seat 101 to slide in the front-rear directions. The sliding mechanism 103 includes a first rail 103A, and a second rail 103B, arranged apart from each other in the width directions of the vehicle seat 101. The first leg 101C is retained by the first rail 103A in a slideable manner. The second leg 101D is retained by the second rail 103B in a slideable manner.

The seat belt 101E shown in FIG. 1 is retained by the seatback 101B. The seat belt 101E has a plate, which can be attached to and detached from the belt buckle 101F, disposed on an outer side of the seat cushion 101A in the width directions.

The seat belt 101E extends from one shoulder portion of the seatback 101B to the belt buckle 101F to be worn by the occupant of the vehicle seat 101. In a state where the wheelchair 102 is restrained to the vehicle seat 101, the seat belt 101E can also be worn by an occupant of the wheelchair 102.

<Engagement Target Portion>

Figure 3:
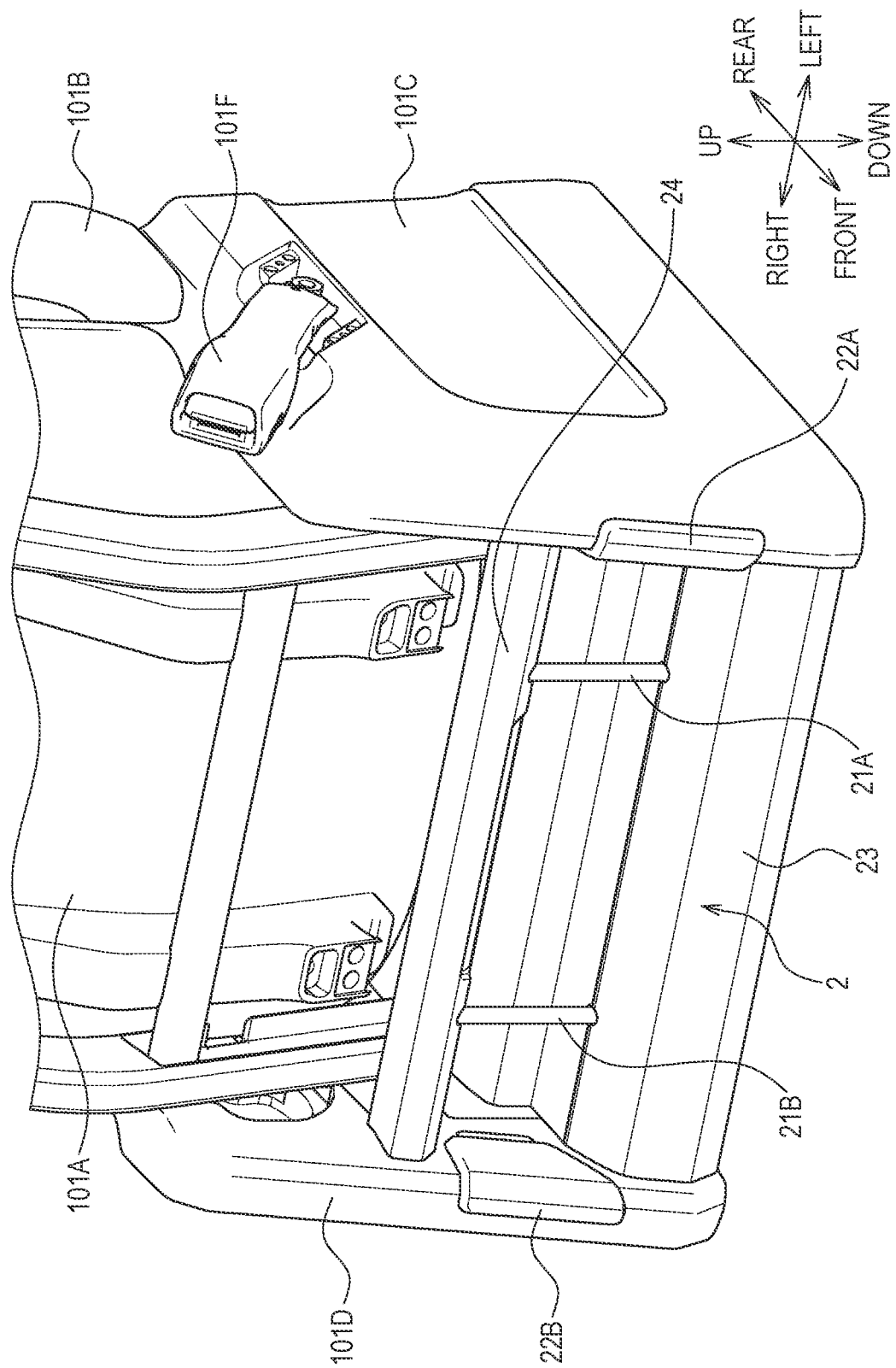
FIG. 3 is a schematic perspective view of an engagement target portion in the vehicle seat in FIG. 2.

As shown in FIG. 3, the engagement target portion 2 is provided below the seat cushion 101A and the seatback 101B of the vehicle seat 101. The engagement target portion 2 includes: a first striker 21A; a second striker 21B; a first bumper 22A; a second bumper 22B; a pedestal 23; and a support beam 24.

Each of the first striker 21A and the second striker 21B is a rod-like member that extends in the up-down directions. The first striker 21A and the second striker 21B are arranged apart from each other in the width directions of the wheelchair 102 restrained to the vehicle seat 101 (that is, in the width directions of the vehicle seat 101).

The first striker 21A is disposed on a left side of the second striker 21B. The first striker 21A and the second striker 21B are arranged to align with each other in the width directions of the vehicle seat 101. In other words, the first striker 21A and the second striker 21B have the same front-rear-direction alignment on the vehicle seat 101.

In addition, the first striker 21A and the second striker 21B are disposed between the first leg 101C and the second leg 101D in the width directions of the vehicle seat 101. The distance between the first leg 101C and the first striker 21A is the same as the distance between the second leg 101D and the second striker 21B.

The first bumper 22A and the second bumper 22B are disposed on outer sides of the first striker 21A and the second striker 21B in the width directions. Specifically, the first bumper 22A is disposed on a left side and in front of the first striker 21A. The second bumper 22B is disposed on a right side and in front of the second striker 21B.

The first bumper 22A is a curved-plate-like member fixed to a front end of the first leg 101C. The first bumper 22A is arranged to bridge a front-end surface of the first leg 101C and a right surface of the first leg 101C (that is, a surface facing the second bumper 22B).

The second bumper 22B is a curved-plate-like member fixed to a front end of the second leg 101D. The second bumper 22B is arranged to bridge a front-end surface of the second leg 101D and a left surface of the second leg 101D (that is, a surface facing the first bumper 22A).

The pedestal 23 supports bottom ends of the first striker 21A and the second striker 21B. The pedestal 23 connects the first leg 101C and the second leg 101D in the width directions. An upper surface of the pedestal 23 is curved in such a manner that its inclination angle relative to a horizontal direction decreases towards rearward. In other words, the pedestal 23 includes a guide surface to guide the engagement portion 3 upward.

The support beam 24 retains upper ends of the first striker 21A and the second striker 21B. The support beam 24 connects the first leg 101C and the second leg 101D in the width directions above the pedestal 23.

<Wheelchair>

Figure 4:
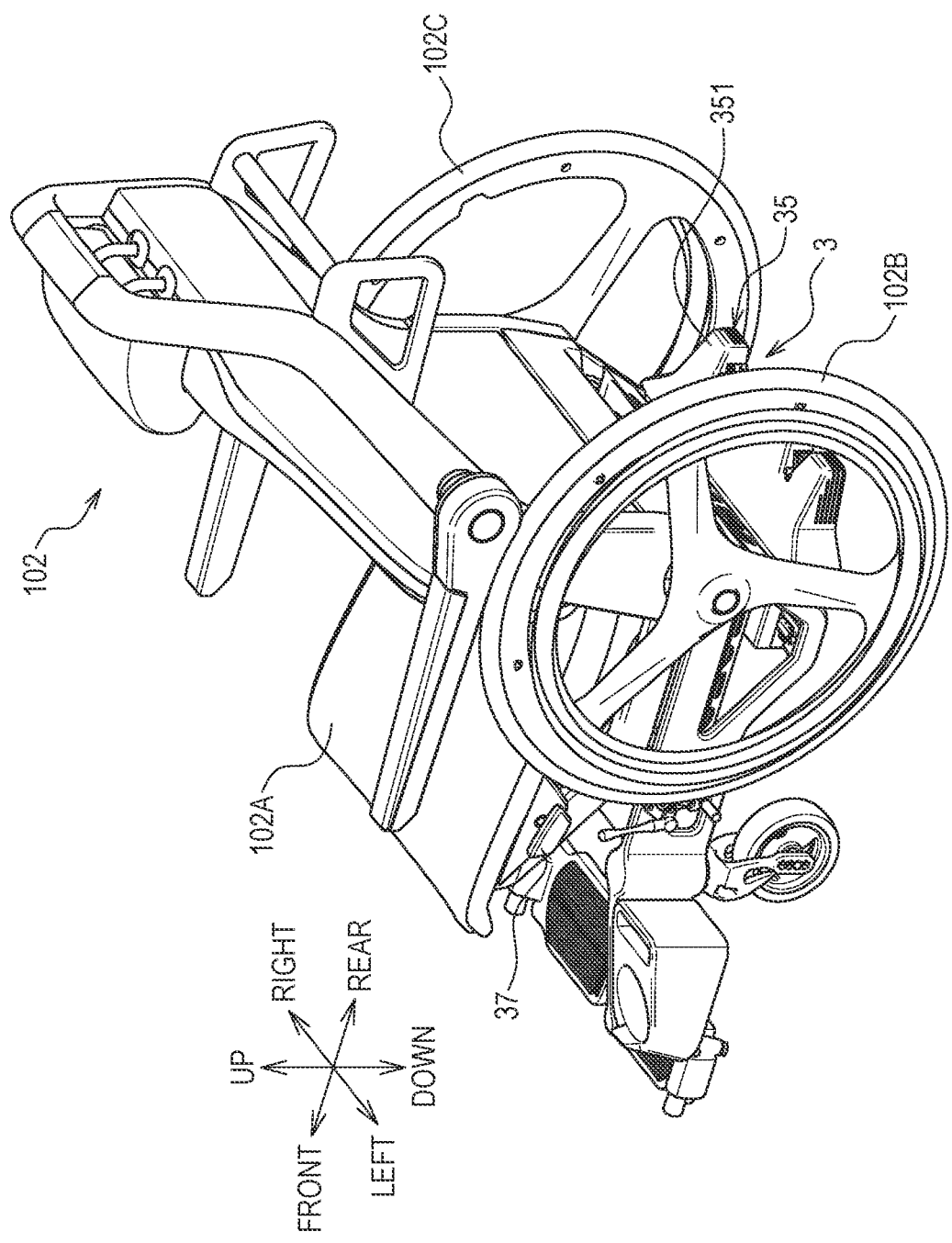
FIG. 4 is a schematic perspective view of the wheelchair with the wheelchair restraint mechanism in FIG. 1.

As shown in FIG. 4, the wheelchair 102 includes: a seat 102A; a first wheel 102B; a second wheel 102C; and the engagement portion 3.

The first wheel 102B and the second wheel 102C are each rotatably attached to the seat 102A. The first wheel 102B is situated on a left side of the second wheel 102C. The seat 102A, the first wheel 102B, and the second wheel 102C are components for publicly known wheelchairs. The wheelchair 102 is able to travel in the front-rear directions of the seat 102A.

<Engagement Portion>

Figure 5:
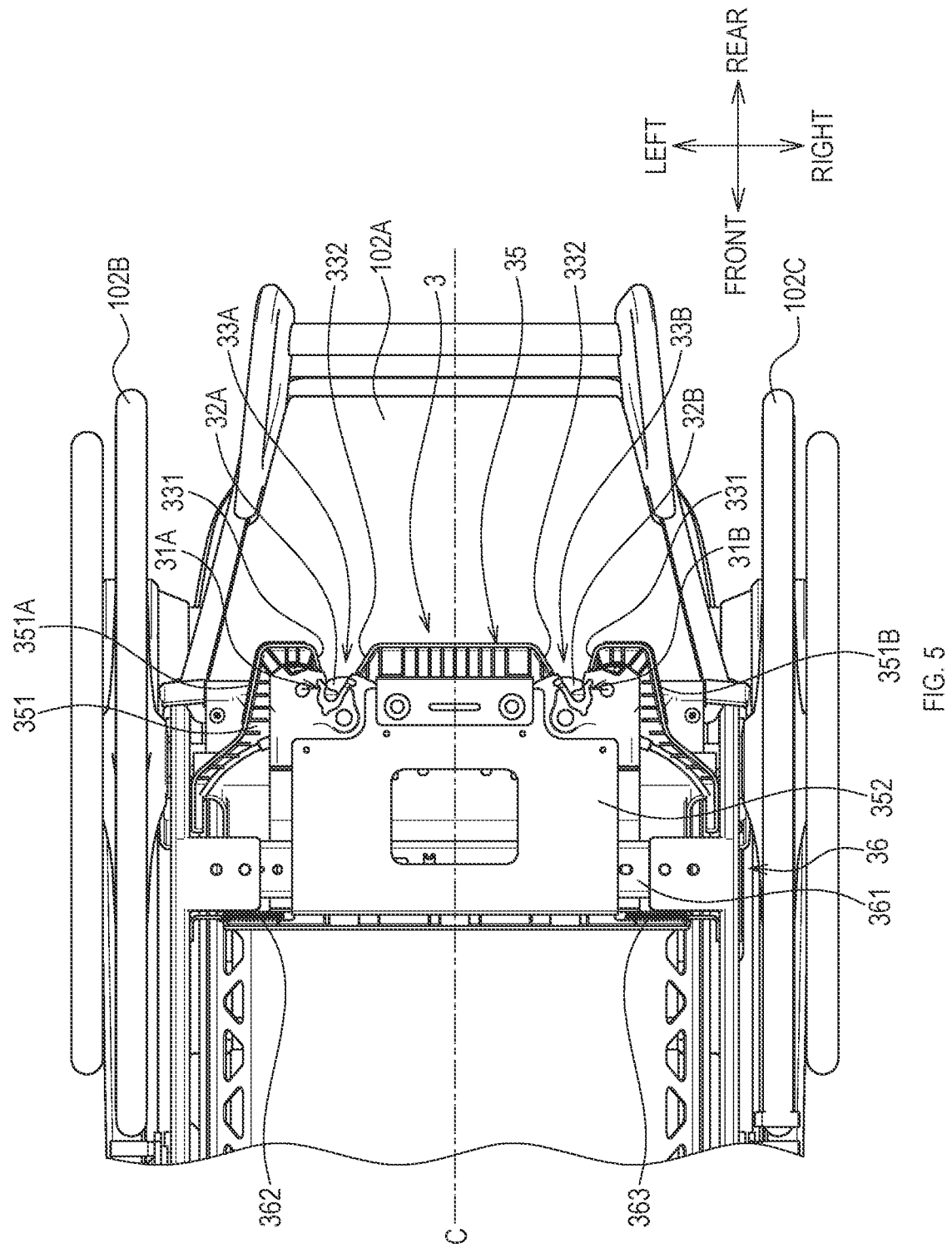
FIG. 5 is a schematic bottom view of an engagement portion of the wheelchair in FIG. 4.

As shown in FIG. 5, the engagement portion 3 includes: a first housing member 31A; a second housing member 31B; a first latch 32A; a second latch 32B; a first guide member 33A; a second guide member 33B; a base 35; a position adjustment mechanism 36; and a release lever 37 (see, FIG. 4). FIG. 5 is a schematic drawing of the wheelchair 102 viewed from the bottom.

The first housing member 31A is a concave configured to house the first striker 21A. The second housing member 31B is a concave configured to house the second striker 21B. Each of the first housing member 31A and the second housing member 31B has a C shape with a rearward opening when viewed from the top. The first striker 21A and the second striker 21B are respectively inserted in the first housing member 31A and the second housing member 31B from the rearward.

Figure 6:
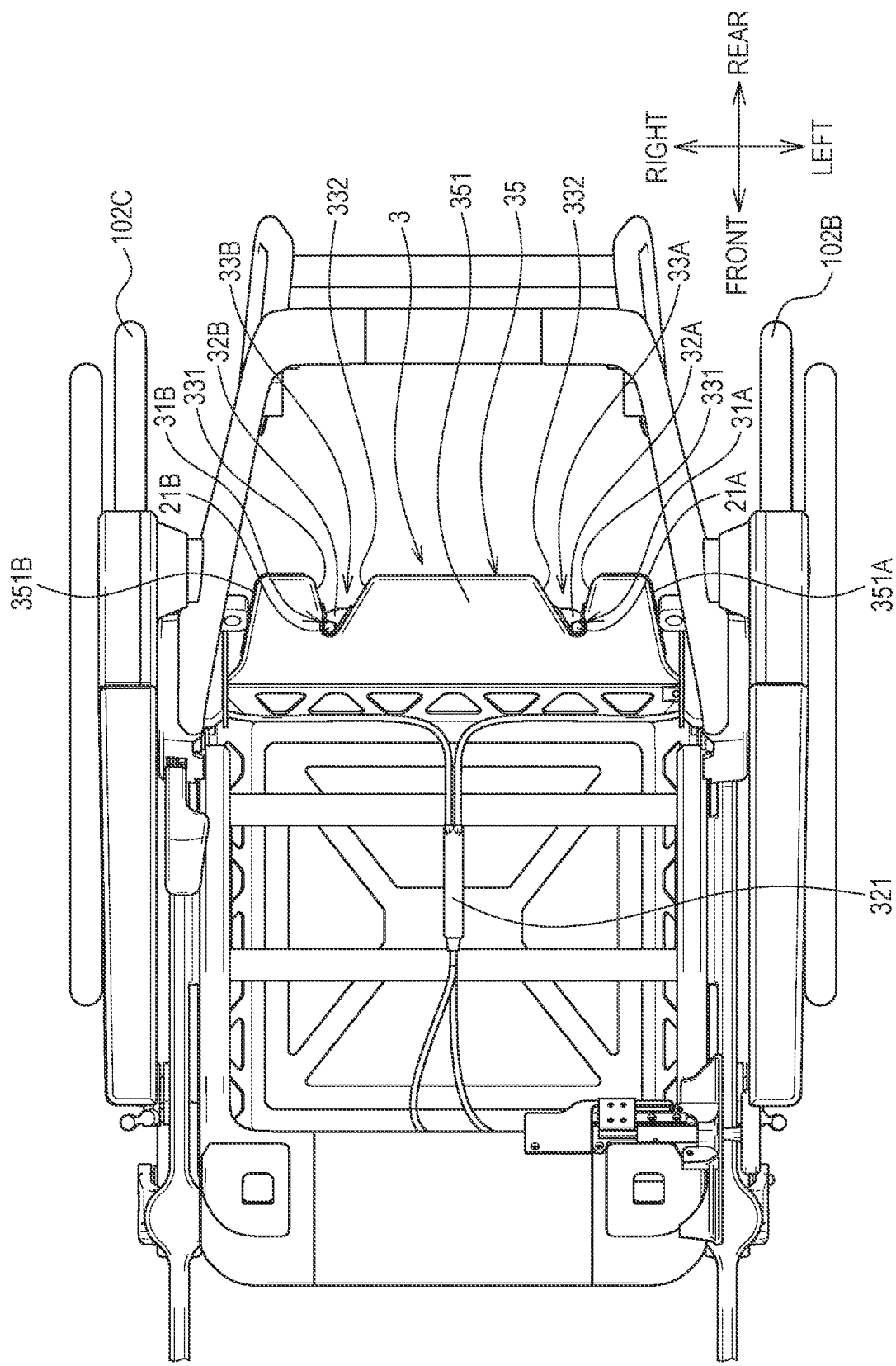
FIG. 6 is a schematic plan view of the engagement portion in FIG. 5.

The first latch 32A is configured to limit separation of the first striker 21A from the first housing member 31A. As shown in FIGS. 6 and 7, the first latch 32A is configured to change between a locked position, where the first latch 32A limits a rearward movement of the first striker 21A by closing the opening of the first housing member 31A, and an unlocked position, where the first latch 32A opens the first housing member 31A. FIG. 6 is a plan view of the seat 102A of the wheelchair 102 in which a part thereof is omitted.

In the locked position, the first latch 32A moves to the unlocked position in response to an imposition of a load from the rearward. The first latch 32A is biased from the unlocked position to the locked position by an elastic element (not shown).

As the wheelchair 102 moves rear towards the vehicle seat 101, the first striker 21A collides with the front of the first latch 32A in the locked position. Consequently, the first latch 32A moves to the unlocked position, and the first striker 21A is housed in the first housing member 31A. When the first striker 21A is housed in the first housing member 31A and the first latch 32A is released from the load, this biasing force causes the first latch 32A to move to the locked position. This causes the first striker 21A to be locked.

The second latch 32B is configured to limit separation of the second striker 21B from the second housing member 31B. The second latch 32B is configured in the same manner as the first latch 32A. In other words, the second latch 32B moves from the locked position to the unlocked position by a collision with the second striker 21B and is also biased from the unlocked position to the locked position.

By causing the wheelchair 102 to move in reverse from a location ahead of the vehicle seat 101 towards the vehicle seat 101, the first striker 21A and the second striker 21B are respectively housed in the first housing member 31A and the second housing member 31B, and also held by the first latch 32A and the second latch 32B. This causes the engagement portion 3 to be restrained to the engagement target portion 2.

The first latch 32A and the second latch 32B are connected to the release lever 37 shown in FIG. 4 via a wire 321 shown in FIG. 6. Manipulation of the release lever 37 causes the first latch 32A and the second latch 32B to change from the locked position to the unlocked position.

When the occupant of the wheelchair 102 restrained to the vehicle seat 101 moves the wheelchair 102 forward while manipulating the release lever 37, the wheelchair 102 is released from the vehicle seat 101. When the manipulation of the release lever 37 is stopped, the first latch 32A and the second latch 32B return to the locked position by the biasing force.

The first guide member 33A is configured to guide the first striker 21A towards the first housing member 31A. The first guide member 33A is provided rearward of the first housing member 31A in a continuous manner with the first housing member 31A.

The first guide member 33A includes a first guide surface 331 and a second guide surface 332, which face each other in the width directions and have a distance therebetween decreasing towards the first housing member 31A. The first guide surface 331 and the second guide surface 332 demarcate a path passed by the first striker 21A.

The first guide surface 331 and the second guide surface 332 each extend parallel with the up-down directions. The first guide surface 331 of the first guide member 33A is arranged on a left side of the second guide surface 332, and extends left rearward from the first housing member 31A. The second guide surface 332 extends right rearward from the first housing member 31A.

The first latch 32A is arranged in the first guide member 33A. The first latch 32A in the locked position stretches from the first guide surface 331 to the second guide surface 332. The first latch 32A pivots in a direction away from the first guide surface 331, thereby changing from the locked position to the unlocked position.

The second guide member 33B is configured to guide the second striker 21B towards the second housing member 31B. The second guide member 33B is provided rearward of the second housing member 31B in a continuous manner with the second housing member 31B.

The second guide member 33B has a mirror image shape relative to the first guide member 33A with respect to a center line in the width directions of the wheelchair 102. In other words, the second guide member 33B includes the first guide surface 331 and the second guide surface 332, which face each other in the width directions and have a distance therebetween decreasing towards the second housing member 31B. The second latch 32B is arranged in the second guide member 33B.

The base 35 is retained by the seat 102A, and arranged between the first wheel 102B and the second wheel 102C in the width directions. As shown in FIG. 5, the base 35 includes a cover 351 and a support plate 352.

The cover 351 houses an operating mechanism for the first latch 32A and the second latch 32B. In other words, the first latch 32A and the second latch 32B are held by the base 35. A rear end of the cover 351 is provided with the first housing member 31A, the second housing member 31B, the first guide member 33A, and the second guide member 33B.

A length of the cover 351 in the width directions (that is, a length thereof in right-left directions) becomes greater along insertion directions of the first striker 21A and the second striker 21B in the first housing member 31A and the second housing member 31B, respectively (that is, towards a front side).

Specifically, at a left end of the rear end of the cover 351 (that is, on a left side of the first housing member 31A), there is provided a first collision surface 351A, which is parallel with the up-down directions, and inclined such that a distance between which and a center line C in the width directions of the wheelchair 102 decreases towards the front side.

Also, at a right end of the rear end of the cover 351 (that is, on a right side of the second housing member 31B), there is provided a second collision surface 351B, which is parallel with the up-down directions, and inclined such that a distance between which and the center line C in the width directions of the wheelchair 102 decreases towards the front side.

The first collision surface 351A collides with the first bumper 22A of the vehicle seat 101 or slides when the engagement portion 3 moves towards the engagement target portion 2. The second collision surface 351B collides with the second bumper 22B of the vehicle seat 101 or slides when the engagement portion 3 moves towards the engagement target portion 2. The base 35 is inserted in a lower part of the vehicle seat 101 from the front side when the engagement portion 3 engages with the engagement target portion 2 (that is, when the wheelchair 102 is restrained to the vehicle seat 101).

As shown in FIG. 7, the first collision surface 351A and the second collision surface 351B are provided with a plurality of ridges 351C arranged side by side in the up-down directions. A part of the plurality of ridges 351C extends from the first collision surface 351A or the second collision surface 351B to a front-end surface of the cover 351.

The support plate 352 shown in FIG. 5 is fixed to the cover 351 from a lower side. The support plate 352 and the cover 351 are arranged to interpose a frame 361 of the position adjustment mechanism 36 therebetween in the up-down directions. A length of the support plate 352 in the width directions is smaller than the cover 351. A rear end of the support plate 352 is situated forward of the rear end of the cover 351.

The position adjustment mechanism 36 is configured to bias the base 35 towards a center of the wheelchair 102 in the width directions and to hold the base 35 movably in the width directions. The position adjustment mechanism 36 includes: the frame 361; a first spring 362; and a second spring 363.

The frame 361 extends along a seat width direction. The frame 361 is fixed to the seat 102A, and supports the base 35 movably in the width directions.

In the first spring 362, one end is attached to an area of the base 35 on a left side of a center thereof in the width directions, and the other end is attached to the seat 102A. In the second spring 363, one end is attached to an area of the base 35 on a right side of the center thereof in the width directions, and the other end is attached to the seat 102A.

The first spring 362 and the second spring 363 bias the base 35 towards an initial position set at the center thereof in the width directions. In response to the base 35 moving to the right side because of the collision with the first bumper 22A, the first spring 362 extends and the second spring 363 is compressed. This causes a leftward biasing force to be generated on the base 35. In response to the base 35 moving to the left side because of the collision with the second bumper 22B, the first spring 362 is compressed and the second spring 363 extends. This causes a rightward biasing force to be generated on the base 35.

[1-2. Effects]

According to the embodiment detailed as above, the following effects can be obtained.

(1a) The first striker 21A and the second striker 21B are respectively guided towards the first housing member 31A and the second housing member 31B, which are positioned in a fixed manner, respectively by the first guide surface 331 and the second guide surface 332 of the first guide member 33A and those of the second guide member 33B when the engagement target portion 2 and the engagement portion 3 engage with each other. Owing to this, the alignment between the first striker 21A and the first latch 32A, and the alignment between the second striker 21B and the second latch 32B can be easily made.

(1b) The first striker 21A is held by the first housing member 31A and the first latch 32A, and the second striker 21B is held by the second housing member 31B and the second latch 32B, whereby a stable restraint of the wheelchair 102 can be enhanced.

(1c) With the position adjustment mechanism 36, misalignments between the first striker 21A and the first latch 32A, and between the second striker 21B and the second latch 32B in the width directions of the wheelchair 102 can be absorbed by a movement of the base 35 in the width directions. This facilitates easy alignments between the first striker 21A and the first latch 32A, and between the second striker 21B and the second latch 32B.

(1d) When the engagement target portion 2 and the engagement portion 3 engage with each other, an end of the base 35 in the width directions of the wheelchair 102 comes into contact with the first bumper 22A or the second bumper 22B, whereby a position of the base 35 is adjusted. This consequently facilitates easy alignments between the first striker 21A and the first latch 32A, and between the second striker 21B and the second latch 32B.

(1e) By providing the engagement target portion 2 in the vehicle seat 101 and providing the engagement portion 3 in the wheelchair 102, the wheelchair 102 can be provided with a manipulating part for unlocking the first latch 32A and the second latch 32B. It consequently allows the occupant of the wheelchair 102 to release the first latch 32A and the second latch 32B.

(1f) By having the vehicle seat 101 serve as the restraining member of the wheelchair 102, the wheelchair 102 and the vehicle seat 101 can be integrated. It consequently allows the occupant of the wheelchair 102 to use the seat belt 101E of the vehicle seat 101.

2. Other Embodiments

An embodiment of the present disclosure has been explained above. Nevertheless, the present disclosure can be carried out in various modifications without being limited to the aforementioned embodiments.

(2a) In the wheelchair restraint mechanism of the aforementioned embodiment, the engagement target portion may include one, three, or more strikers. The engagement portion may include: one, three, or more housing members; one, three, or more latches; and one, three, or more guide members.

(2b) In the wheelchair restraint mechanism of the aforementioned embodiment, the engagement target portion does not necessarily have to include a bumper. Also, the engagement portion does not necessarily have to include a position adjustment mechanism.

(2c) In the wheelchair restraint mechanism of the aforementioned embodiment, the restraining member to which the wheelchair is restrained does not necessarily have to be a vehicle seat. For example, the restraining member may be a structure or component other than the vehicle seat, such as a wall or a frame body installed in a vehicle.

(2d) In the wheelchair restraint mechanism of the aforementioned embodiment, the engagement target portion (that is, the striker) may be provided in the wheelchair. The engagement portion (that is, the latch) may be provided in a restraining member, such as a vehicle seat.

(2e) Functions of one element in the aforementioned embodiments may be achieved by two or more elements. Functions of two or more elements may be integrated into one element. A part of the configuration in the aforementioned embodiments may be omitted. At least a part of the configuration in the aforementioned embodiments may be added to or replaced with other part of the configuration in the aforementioned embodiments. It should be noted that any and all modes included in the technical ideas that are identified by the languages recited in the claims are embodiments of the present disclosure.

What is claimed is:

1. A wheelchair restraint mechanism configured to restrain a wheelchair to a restraining member installed on a vehicle, the mechanism comprising:

an engagement target portion provided in a first member, which is either one of the wheelchair and the restraining member; and an engagement portion provided in a second member, which is the other one of the wheelchair and the restraining member, the engagement target portion comprising at least one striker having a rod shape extending in up-down directions, the engagement portion comprising: at least one housing member configured to house the at least one striker; at least one latch configured to limit separation of the at least one striker from the at least one housing member; at least one guide member configured to guide the striker towards the at least one housing member; a base provided with the at least one housing member and the at least one guide member; and a position adjustment mechanism configured to bias the base towards a center in width directions of the wheelchair restrained to the restraining member and to hold the base movably in the width directions, wherein the at least one guide member comprises a first guide surface and a second guide surface, which face each other in the width directions and have a distance therebetween decreasing towards the at least one housing member.

2. The wheelchair restraint mechanism according to claim 1, wherein the engagement target portion comprises a plurality of strikers arranged apart from one another in the width directions as the at least one striker, and wherein the engagement portion comprises: a plurality of housing members; a plurality of latches; and a plurality of guide members, as the at least one housing member, the at least one latch, and the at least one guide member, respectively.

3. The wheelchair restraint mechanism according to claim 1, wherein the engagement target portion comprises a bumper disposed on an outer side of the at least one striker in the width directions, and wherein a length of the base in the width directions becomes greater along an insertion direction of the at least one striker in the at least one housing member.

4. The wheelchair restraint mechanism according to claim 1, wherein the engagement target portion is provided in the restraining member, and wherein the engagement portion is provided in the wheelchair.

5. A wheelchair restraint mechanism configured to restrain a wheelchair to a restraining member installed on a vehicle, the mechanism comprising:

an engagement target portion provided in a first member, which is either one of the wheelchair and the restraining member; and an engagement portion provided in a second member, which is the other one of the wheelchair and the restraining member, the engagement target portion comprising at least one striker having a rod shape extending in up-down directions, the engagement portion comprising: at least one housing member configured to house the at least one striker; at least one latch configured to limit separation of the at least one striker from the at least one housing member; and at least one guide member configured to guide the striker towards the at least one housing member, wherein the at least one guide member comprises a first guide surface and a second guide surface, which face each other in width directions of the wheelchair restrained to the restraining member and have a distance therebetween decreasing towards the at least one housing member, and wherein the restraining member is a vehicle seat.

* * * * *